United States Patent
Shabtai et al.

(10) Patent No.: US 10,630,626 B2
(45) Date of Patent: Apr. 21, 2020

(54) SYSTEMS AND METHODS FOR AUTOMATED INTERVIEW ASSISTANCE

(71) Applicant: Facebook, Inc., Menlo Park, CA (US)

(72) Inventors: Daniel Shabtai, Sunnyvale, CA (US); Veenus Gupta, Hayward, CA (US); Chuchu Zhao, Mountain View, CA (US); Xiheng Zhang, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 154 days.

(21) Appl. No.: 15/582,444

(22) Filed: Apr. 28, 2017

(65) Prior Publication Data
US 2018/0316642 A1    Nov. 1, 2018

(51) Int. Cl.
*H04L 12/58* (2006.01)
*G06Q 10/10* (2012.01)

(52) U.S. Cl.
CPC ......... *H04L 51/18* (2013.01); *G06Q 10/1053* (2013.01); *G06Q 10/1097* (2013.01); *H04L 51/04* (2013.01)

(58) Field of Classification Search
CPC ..... H04L 51/18; H04L 51/04; H04L 65/1069; G06Q 10/1053; G06Q 10/1097
See application file for complete search history.

(56) References Cited

U.S. PATENT DOCUMENTS

| | | | | |
|---|---|---|---|---|
| 6,311,164 B1* | 10/2001 | Ogden | ........... | G06Q 10/063112 705/7.14 |
| 6,618,734 B1* | 9/2003 | Williams | ................ | G06Q 10/06 |
| 7,496,518 B1* | 2/2009 | Cayton | .................. | G06Q 10/10 705/321 |
| 7,650,286 B1* | 1/2010 | Obeid | ................ | G06Q 10/1053 705/1.1 |
| 7,747,785 B2* | 6/2010 | Baker, III | ............ | G06Q 10/107 709/206 |
| 8,572,000 B1* | 10/2013 | Weingarten | ........ | G06Q 10/1053 705/320 |
| 9,965,746 B1* | 5/2018 | Keiser | .................. | G06Q 10/109 |
| 10,079,013 B2* | 9/2018 | Kalns | .................. | G10L 15/1822 |
| 2001/0034661 A1* | 10/2001 | Ferreira | ............. | G06F 3/04815 705/14.4 |
| 2002/0128894 A1* | 9/2002 | Farenden | ....... | G06Q 10/063112 705/7.14 |
| 2002/0143573 A1* | 10/2002 | Bryce | .................... | G06Q 10/10 705/321 |
| 2003/0014294 A1* | 1/2003 | Yoneyama | ..... | G06Q 10/063112 705/7.14 |
| 2004/0073490 A1* | 4/2004 | Shah | ....................... | G06Q 10/08 705/26.1 |
| 2004/0111267 A1* | 6/2004 | Jadhav | ................... | G06Q 10/10 704/270 |
| 2005/0060175 A1* | 3/2005 | Farber | ............... | G06Q 10/1053 705/321 |

(Continued)

*Primary Examiner* — Blake J Rubin
(74) *Attorney, Agent, or Firm* — Sheppard Mullin Richter & Hampton LLP

(57) ABSTRACT

Systems, methods, and non-transitory computer-readable media can initiate a messaging session with an interviewer, the messaging session associated with a scheduled interview to be conducted by the interviewer. A message is received in the messaging session from the interviewer. A pre-defined function is automatically performed based on the message.

20 Claims, 9 Drawing Sheets

(56) References Cited

U.S. PATENT DOCUMENTS

| | | | |
|---|---|---|---|
| 2005/0125544 A1* | 6/2005 | Zhao | H04L 51/04 709/227 |
| 2006/0178896 A1* | 8/2006 | Sproul | G06Q 10/10 705/321 |
| 2008/0300966 A1* | 12/2008 | Gocha | G06Q 10/063112 705/7.14 |
| 2011/0208665 A1* | 8/2011 | Hirsch | G06Q 10/1053 705/321 |
| 2011/0276507 A1* | 11/2011 | O'Malley | G06Q 10/00 705/321 |
| 2011/0307402 A1* | 12/2011 | Krishnakumar | G06Q 10/105 705/321 |
| 2012/0109837 A1* | 5/2012 | Sahagun | G06Q 10/1053 705/321 |
| 2012/0271675 A1* | 10/2012 | Christensen | G06Q 10/1053 705/7.14 |
| 2013/0097093 A1* | 4/2013 | Kolber | G06Q 10/1053 705/321 |
| 2014/0019585 A1* | 1/2014 | Vishnubhatla | H04L 67/06 709/217 |
| 2014/0052656 A1* | 2/2014 | Ball | G06Q 10/1053 705/319 |
| 2014/0058954 A1* | 2/2014 | Perlstein | G06Q 10/1053 705/80 |
| 2014/0122152 A1* | 5/2014 | Lee | G06Q 10/1053 705/7.19 |
| 2014/0156550 A1* | 6/2014 | Olivier | G06Q 10/1053 705/321 |
| 2014/0236850 A1* | 8/2014 | Holland | G06Q 10/1053 705/321 |
| 2014/0278683 A1* | 9/2014 | Kennell | G06Q 10/1053 705/7.19 |
| 2014/0280292 A1* | 9/2014 | Skinder | G06F 16/24534 707/767 |
| 2015/0149232 A1* | 5/2015 | Dietz | G06Q 10/1095 705/7.19 |
| 2015/0278768 A1* | 10/2015 | Boring | G06Q 10/1053 705/321 |
| 2015/0339631 A1* | 11/2015 | Hodges | G06Q 10/1053 705/319 |
| 2016/0026347 A1* | 1/2016 | Gehring | G06Q 10/06 715/810 |
| 2016/0162840 A1* | 6/2016 | Roberts | G06Q 10/1053 705/321 |
| 2016/0171452 A1* | 6/2016 | Brown | G06Q 10/1095 705/7.19 |
| 2016/0275439 A1* | 9/2016 | Avats | G06Q 10/063118 |
| 2017/0039525 A1* | 2/2017 | Seidle | G06Q 10/1053 |
| 2017/0180284 A1* | 6/2017 | Smullen | H04L 67/322 |
| 2017/0212917 A1* | 7/2017 | Chiesa | H04L 67/306 |
| 2017/0344532 A1* | 11/2017 | Zhou | G06F 17/2881 |
| 2018/0060823 A1* | 3/2018 | Garimella | G06Q 10/1053 |
| 2018/0150739 A1* | 5/2018 | Wu | G06F 17/271 |
| 2018/0183735 A1* | 6/2018 | Naydonov | H04L 51/02 |
| 2018/0197127 A1* | 7/2018 | Brunner | G06Q 10/0633 |
| 2018/0336528 A1* | 11/2018 | Carpenter | G06Q 10/1053 |
| 2019/0019159 A1* | 1/2019 | Champaneria | G06Q 10/1053 |
| 2019/0019160 A1* | 1/2019 | Champaneria | G06Q 10/1053 |
| 2019/0180196 A1* | 6/2019 | Terry | G06N 20/20 |

* cited by examiner

200

202

Candidate Sarah Andrews Interview

Conversation started today

Interview Bot
Hi! I'm Interview Bot! I'm here to help you with your upcoming interview:

Candidate: Sarah Andrews
Position: Programmer
Time: 1:30 pm – 2:00 pm
Method: On Site
Job Description: http://www.examplepost.com/description You can enter notes, upload images, or type "#help" to learn more.
------------------------------------------------
Here's the candidate's resume:

resume.docx                          open   download

204

Write a message...

 Add Files      Add Photos            Send

Candidate Sarah Andrews Interview

204

Position: Programmer
Time: 1:30 pm – 2:00 pm
Method: On Site
Job Description: http://www.examplepost.com/description You can enter notes, upload images, or type "#help" to learn more.
-----------------------------------------------
Here's the candidate's resume:
resume.docx                                              open   download Tyus Johnson
room

210

Interview Bot
Building 4, Conference Room C
click here for a campus map
click here for a building map

212

Tyus Johnson
coordnotes

214

Interview Bot
The interview coordinator has noted:
This candidate is very interested in machine learning.

216

Write a message...

 Add Files      Add Photos                [Send]

Candidate Sarah Andrews Interview — 202, 204

Tyus Johnson
coordnotes — 214

Interview Bot
The interview coordinator has noted:
This candidate is very interested in machine learning. — 216

Tyus Johnson
addfeedback This is a great candidate. Strongly recommend an offer. — 310

Interview Bot
Your feedback has been added to the candidate file. — 312

Tyus Johnson — 314

```
public class HelloWorld {
    public static void main(String[] args) {
        System.out.println("Hello, World");
    }
}
```
— 316

Interview Bot
Your image(s) have been added to the candidate file.

Write a message...

 Add Files    Add Photos   [Send]

SYSTEMS AND METHODS FOR AUTOMATED INTERVIEW ASSISTANCE

FIELD OF THE INVENTION

The present technology relates to the field of scheduling systems. More particularly, the present technology relates to systems and methods for automated interview assistance.

BACKGROUND

Candidate interviews can play a primary role in helping organizations locate qualified job candidates. In some cases, an interview coordinator can schedule interviews for candidates applying for various positions within an organization. The process of assessing job candidates often can be initiated through electronic receipt by the organization of a resume of a job candidate. Resumes can be reviewed to select one or more potentially qualified candidates, who will typically undergo multiple rounds of interviews with various interviewers. For each interview, an interviewer must be assigned for a candidate, and a time and a place must be scheduled. Sometimes, interviews are conducted in person, and an interview space, such as a conference room, must be scheduled. In other situations, interviews may be conducted by phone or via video conference, in which case telephonic and/or video conferencing resources must be arranged. The sheer number of candidates, and the large number of interviews that must be arranged and scheduled can create challenges for both interview coordinators and interviewers.

SUMMARY

Various embodiments of the present disclosure can include systems, methods, and non-transitory computer readable media configured initiate a messaging session with an interviewer, the messaging session associated with a scheduled interview to be conducted by the interviewer. A message is received in the messaging session from the interviewer. A pre-defined function is automatically performed based on the message.

In an embodiment, a pre-defined term is identified in the message. A pre-defined function associated with the pre-defined term is performed.

In an embodiment, the automatically performing the pre-defined function comprises initiating a messaging session between the interviewer and one or more additional individuals.

In an embodiment, the automatically performing the pre-defined function comprises: identifying an interview coordinator associated with the scheduled interview; and initiating a messaging session between the interviewer and the interview coordinator.

In an embodiment, the automatically performing the pre-defined function comprises: identifying a subsequent interviewer associated with the scheduled interview; and initiating a messaging session between the interviewer and the subsequent interviewer.

In an embodiment, the automatically performing the pre-defined function comprises: identifying interview information associated with the scheduled interview; and submitting a message to the messaging session comprising the interview information.

In an embodiment, the interview information comprises at least one of: interview location information, telephonic dial-in information, or video-conference information.

In an embodiment, the automatically performing the pre-defined function comprises updating a candidate file associated with the scheduled interview.

In an embodiment, a pre-defined term in the message is identified, the pre-defined term being indicative of an interviewer request to upload information to a particular portion of the candidate file. The automatically performing the pre-defined function comprises uploading at least a portion of the message to the particular portion of the candidate file.

In an embodiment, the message comprises an image, and the pre-defined function comprises uploading the image to the candidate file.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 2A illustrates an example scenario associated with initiating a messaging session between an interviewer and an interview bot, according to an embodiment of the present disclosure.

FIG. 2B illustrates an example scenario associated providing interview information using an interview bot, according to an embodiment of the present disclosure.

FIG. 3 illustrates an example scenario associated with updating a candidate file using an interview bot, according to an embodiment of the present disclosure.

Figure 1:
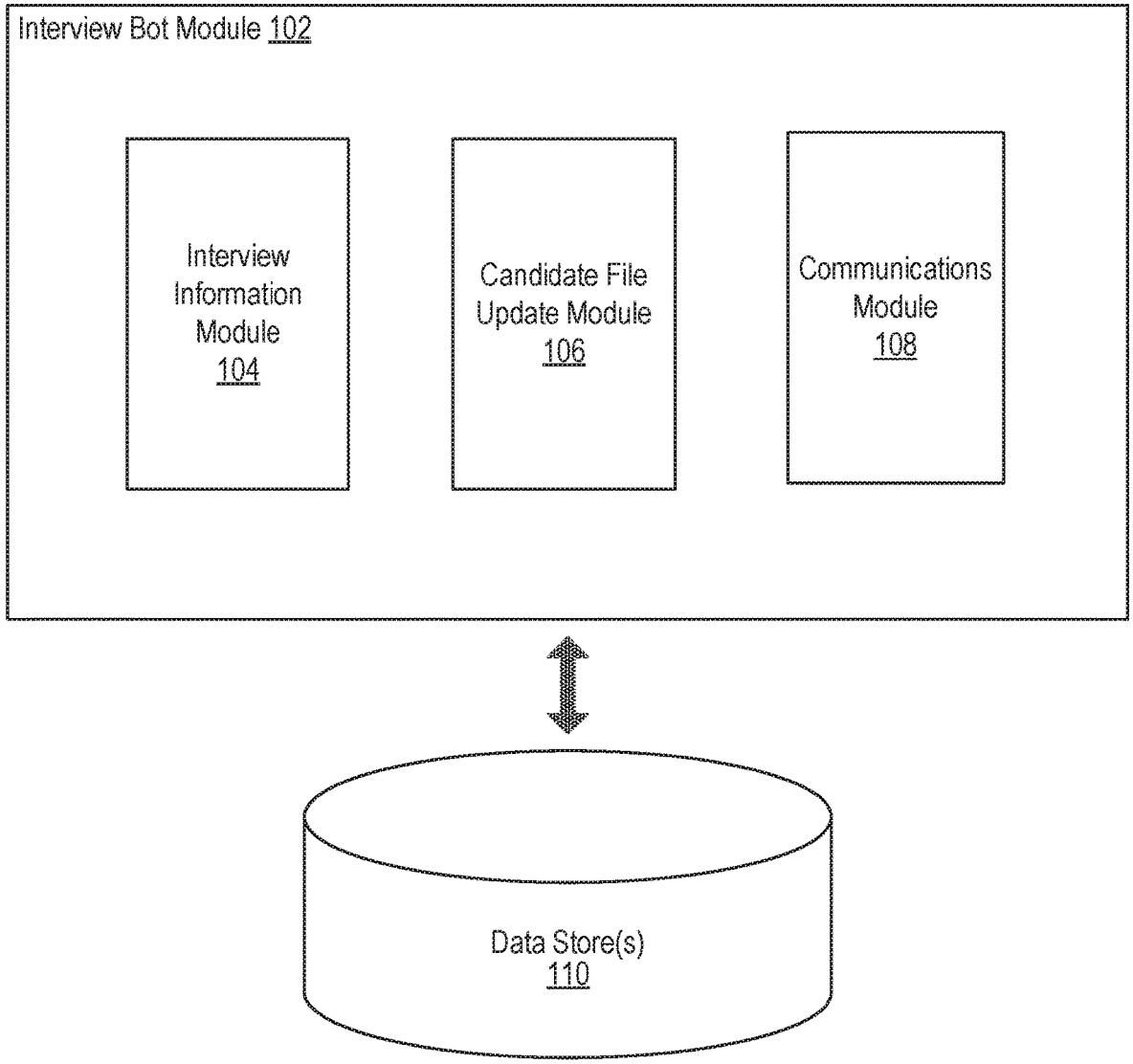
FIG. 1 illustrates an example system including an interview bot module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Systems and Methods for Automated Interview Assistance

As mentioned, candidate interviews can play a primary role in helping organizations locate qualified job candidates. In some cases, an interview coordinator can schedule interviews for candidates applying for various positions within an organization. The process of assessing job candidates often can be initiated through electronic receipt by the organization of a resume of a job candidate. Resumes can be reviewed to select one or more potentially qualified candidates, who will typically undergo multiple rounds of interviews with various interviewers. For each interview, an interviewer must be assigned for a candidate, and a time and a place must be scheduled. Sometimes, interviews are conducted in person, and an interview space, such as a conference room, must be scheduled. In other situations, interviews may be conducted by phone or via video conference, in which case telephonic and/or video conferencing resources must be arranged. The sheer number of candidates, and the large number of interviews that must be arranged and scheduled, can create challenges for both interview coordinators and interviewers.

One common challenge confronted by organizations is effectively scheduling a very large number of interviews, and dealing with issues that may arise during interviews. Conventional approaches generally place a large burden on one or more interview coordinators to ensure that each interview is scheduled, that any necessary resources are also scheduled, and that interviews are conducted in an efficient and timely manner. Interview coordinators can often act as central points of knowledge for any interviewees or interviewers that may have questions about or issues with scheduled interviews. Conventional approaches to scheduling and conducting interviews also place a large burden on employees of an organization that may act as interviewers of potential candidates. Interviewers are tasked with being familiar with any necessary details of their scheduled interviews, e.g., whether interviews are to be performed in person or via remote connection (e.g., telephone or video conference), how to contact the candidate for a remote interview, where to go for an in-person interview, where to take the candidate after an interview, etc. Furthermore, when candidates are interviewed, they will typically see multiple interviewers in a single day. As such, interviewers are generally tasked with staying on schedule and directing candidates to their next interview. However, if issues arise with an interview, such as a problem with a reserved resource, or a delay in the interviewee's schedule, it can lead to confusion as interview schedules are changed and various parties must be contacted to inform them of changes or problems.

An improved approach rooted in computer technology overcomes the foregoing and other disadvantages associated with conventional approaches specifically arising in the realm of computer technology. Systems, methods, and computer readable media of the present technology can employ a messaging service to provide an interview bot. Interviewers can exchange messages with the interview bot via the messaging service to automatically receive information about an interview. Interviewers can also exchange messages with the interview bot to update information in a candidate file. For example, interviewers can send information to the interview bot to cause that information to be automatically added to the candidate file. The candidate file can be stored on an online platform in which various parties (e.g., interview coordinators, interviewers, and other decision-makers in the interview process) can add notes and/or feedback about a candidate to assist in making job offer decisions. Interviewers can also exchange messages with the interview bot to contact other individuals that are involved in interviewing a candidate. For example, interviewers can send a message to the interview bot that will automatically open up a messaging session with an interview coordinator and/or one or more subsequent interviewers. More details regarding the present technology are described herein.

FIG. 1 illustrates an example system 100 including an interview bot module 102, according to an embodiment of the present disclosure. The interview bot module 102 can be configured to provide automated assistance for an interviewer conducting a candidate interview. In certain embodiments, the interview bot module 102 can be configured to provide automated assistance to an interviewer via a messaging system. The messaging system may allow for communications in real time or near real time. In certain embodiments, the messaging system may be an instant messaging system that may be provided, for example, by a social networking system. Shortly before an interviewer is scheduled to conduct an interview with a job candidate, the interview bot module 102 can initiate a messaging session between an interview bot and the interviewer. The messaging session can be associated with an interviewer, a job candidate, and a scheduled interview. In certain embodiments, the interview bot can automatically title the messaging session so that the interviewer can distinguish between multiple messaging sessions associated with different scheduled interviews. The interview bot can perform various functions in response to messages received from the interviewer in the messaging session. The interview bot can be configured with a plurality of pre-defined terms that an interviewer can include in messages to cause the interview bot to perform certain pre-defined functions. In one example, certain pre-defined terms, when included in a message submitted by the interviewer, may cause the interview bot to provide information relating to the scheduled interview. In another example, certain pre-defined terms may cause the interview bot to update a candidate file associated with the job candidate. In yet another example, certain pre-defined terms may cause the interview bot to initiate communications between the interviewer and other individuals that are involved with the job candidate's interview process. For example, communications may be initiated with an interview coordinator and/or subsequent interviewers that are scheduled to interview the job candidate after the current interviewer.

As shown in the example of FIG. 1, the interview bot module 102 can include an interview information module 104, a candidate file update module 106, and a communications module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the interview bot module 102 can be implemented in any suitable combinations.

In some embodiments, the interview bot module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the interview bot module 102 can be implemented, in part or in whole, as software running on one or more computing devices or systems, such as on a user or client computing device. For example, the interview bot module 102, or at least a portion thereof, can be implemented as or within an application (e.g., app), a program, or an applet, etc., running on a user computing device or a client computing system, such as the user device 610 of FIG. 6. In another example, the interview bot module 102, or at least a portion thereof, can be implemented using one or more computing devices or systems that include one or more servers, such as network servers or cloud servers. In some instances, the interview bot module 102 can, in part or in whole, be implemented within or configured to operate in conjunction with a social networking system (or service), such as the social networking system 630 of FIG. 6. It should be understood that there can be many variations or other possibilities.

The interview bot module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the interview bot module 102. For example, the data store 110 can store candidate resumes, candidate files for one or more candidates, interview information, and the like. It is contemplated that there can be many variations or other possibilities.

The interview information module 104 can be configured to automatically provide interview information relating to a scheduled interview in response to a message received from an interviewer. In certain embodiments, a messaging session between an interviewer and an interview bot can be associated with a particular scheduled interview for a job candidate. For example, if Interviewer A is scheduled to interview Candidate B at 12:30 p.m. on Dec. 1, 2016, a messaging session can be initiated between Interviewer A and an interview bot that is associated with that scheduled interview. The interviewer can send a message into the messaging session to request interview information. For example, the interviewer can send a message that includes a pre-defined term "# room" in order to be notified of a location that has been reserved for the interview (e.g., a building and conference room). The interview bot can be configured to automatically provide the information requested by the interviewer in response to the interviewer's message. For example, if the interviewer sends a message with the pre-defined term "# room," the interview bot can be configured to review information associated with the schedule interview and to respond with the appropriate location/room information. The interview bot can be configured to provide any information that has been stored and is available for the scheduled interview. For example, the interviewer can send a message including the pre-defined term "# coordnotes" requesting any notes that have been provided by the interview coordinator about the job candidate. The interview bot can search a candidate file associated with the job candidate and provide the interviewer with any notes provided by the coordinator. In another example, the interviewer can send a message including the pre-defined term "# questions" to view questions that have been asked by previous interviewers of the job candidate so as not to repeat questions that have already been asked. The interview bot can return any questions that have been uploaded to the candidate file by previous interviewers. In another example, the interviewer can send a message including the pre-defined term "# interview" to see any upcoming interviews for which he or she is scheduled (e.g., interviews for the next week). The interview bot can return information relating to upcoming interviews of the interviewer.

In certain embodiments, interviews may be conducted remotely, and interviewers may require information for connecting to the remote job candidate. For example, an interviewer may request telephonic dial-in information (e.g., by sending a message with the pre-defined term "# dialin"), or video-conference information, such as a URL link for a video conferencing session (e.g., by sending a message with the pre-defined term "# videoconference"). Certain interviews may require remote parties to share a display. For example, if a job candidate is interviewing for a programming position, the interviewer may ask the interviewee to write some code during the interview. The interviewer and interviewee can engage in a shared display session using, for example, a shared display platform such as the Coderpad platform or any other suitable platform. The interviewer can request and receive information relating to set up or execution of the shared display session for a particular scheduled interview (e.g., by sending a message with the pre-defined term "# coderpad").

While various examples of interview information that can be provided by an interview bot are discussed above, it should be appreciated both for the interview information module 104 and any other modules discussed herein, that the interview bot can be configured to access any information that is available. For example, interview information may relate to job description information, candidate information, interviewer information, organization information, interview coordinator information, any information available in a candidate file, and the like.

The candidate file update module 106 can be configured to update a candidate file based on messages submitted to a messaging session by an interviewer. As discussed above, a messaging session between an interview bot and an interviewer may be associated with a particular scheduled interview. It can be appreciated that each scheduled interview has an associated job candidate. Messages submitted to the messaging session by the interviewer can be used to update a candidate file associated with the job candidate. In certain embodiments, similar to the pre-defined terms discussed above with reference to the interview information module 104, certain pre-defined terms may cause the interview bot to update a candidate file in a particular way. For example, if a message begins with, or contains the pre-defined term "# addfeedback," the remaining content of the message may be used to update a feedback portion of the candidate file. If a message begins with, or contains the pre-defined term "# addquestion," the remaining content of the message may be used to update a question portion of the candidate file in which questions asked to the candidate are stored. In certain embodiments, any messages submitted to the messaging session that do not contain a pre-defined term (e.g., "# room," or "# coordnotes," or "# coderpad," etc.) can be automatically stored to the candidate file as interviewer notes and/or interviewer feedback. In certain embodiments, if a message is submitted to the messaging session without a pre-defined term, the message may be used to update a particular portion of a candidate file. For example, if a message is submitted to the messaging session without a pre-defined term, the content of the message may automatically update a feedback portion of a candidate file.

In certain embodiments, non-textual messages, such as images, video, and/or documents, may also be submitted to the messaging session. Non-textual messages submitted to the messaging session may be uploaded to a candidate file. For example, if an interviewee is asked in an in-person interview to write a piece of code on a whiteboard, the interviewer can take a photo of the whiteboard after the interviewee is done. The photo can be submitted to the messaging session so that the photo is uploaded to and added to the candidate file. In certain embodiments, certain types of messages may automatically be added to a particular portion of a candidate file. For example, an image message submitted by an interviewer may automatically cause the image to be added to a "Code Writing" portion of a candidate file.

The communications module 108 can be configured to initiate a new messaging session between an interviewer and other individuals. In certain embodiments, the interviewer can submit a message to a messaging session between the interviewer and an interview bot indicating that the interviewer would like to communicate with one or more other individuals. For example, the interviewer may wish to convey a message to an interview coordinator to let the interview coordinator know that there is a problem with a conference room that has been scheduled, or to inform the interview coordinator of delays or other problems with a scheduled interview. However, the interviewer may not know who the interview coordinator is, or may not have his or her contact information. The interviewer can submit a message having a pre-defined term (e.g., "# alert") to indicate that the interviewer would like to communicate with the interview coordinator. The interview bot, upon receiving the message with the pre-defined term, can be configured to automatically identify the interview coordinator for the particular interview associated with the current messaging session, and initiate a new messaging session between the interviewer and the interview coordinator. The interviewer and the interview coordinator can then message each other directly in the new messaging session.

In another example, an interviewer may be interviewing a job candidate, and may wish to contact the next interviewer scheduled for the job candidate. For example, the interviewer may wish to do so to inform the next interviewer of any delays, or to let the next interviewer know that the candidate is on the way. Again, the interviewer, in a messaging session associated with the current scheduled interview, can submit a message with a pre-defined term (e.g., "# next"), to initiate a new messaging session with the next interviewer. The interview bot can be configured to automatically determine who is the next scheduled interviewer, and to initiate a new messaging session between the interviewer and the next interviewer. In this way, the current interviewer does not have to know who the next scheduled interviewer is, or to look up his or her contact information. These operations are performed automatically by the interview bot.

FIG. 2A illustrates an example scenario 200 associated with initiating a messaging session between an interviewer and an interview bot. As shown in FIG. 2A, the example scenario 200 includes a messaging session 202. The messaging session 202 has been automatically initiated by an interview bot to remind an interviewer of an upcoming scheduled interview. The messaging session 202 is associated with a scheduled interview for a candidate Sarah Andrews, scheduled for 1:30-2:00 p.m. The message session has a title 204, and has been automatically titled "Candidate Sarah Andrews Interview" so that the interviewer can distinguish between messaging sessions he or she may have open for other scheduled interviews. As has been and will be described in greater detail herein, the interviewer can take various actions with respect to the scheduled interview by submitting messages into the messaging session 202.

FIG. 2B illustrates an example scenario 250 associated with receiving requests for and providing interview information using an interview bot. In the example scenario 250, the interviewer, Tyus Johnson, has submitted various messages to the messaging session 202. The various messages include pre-defined terms that are associated with requests for interview information. For example, the interviewer submitted a first message 210 containing the pre-defined term "# room," that is associated with a request for interview room information. The interview bot automatically looked up the interview room information associated with the scheduled interview, and responded with a message 212, which states: "Building 4, Conference Room C." The message 212 also includes links to a campus map and a building map so that the interviewer can locate the room.

The interviewer submitted a second message 214 containing the pre-defined term "# coordnotes," indicative of a request for coordinator notes associated with the scheduled interview. The interview bot automatically looked up any coordinator notes associated with the scheduled interview, and provided the responsive message 216, which states: "This interview coordinator has noted: This candidate is very interested in machine learning."

FIG. 3 illustrates an example scenario 300 associated with updating a candidate file using an interview bot. In FIG. 3, the messaging session 202 continues, and the interviewer has submitted a new message 310. The message 310 includes the pre-defined term "# addfeedback," indicative of a request to update a feedback portion of the candidate file with the contents of the message, i.e., "This is a great candidate. Strongly recommend an offer." The interview bot can be configured to automatically update the candidate file based on the message, e.g., by updating a feedback portion of the candidate file to include the contents of the message. The interview bot provides confirmation that the feedback has been added to the candidate file (message 312). The interviewer has also submitted another message 314, with an image 316. In this example scenario, the image 316 is an image of a whiteboard on which the candidate has written code during the interview. The interview bot can be configured to automatically upload the image file to the candidate file.

Figure 4A:
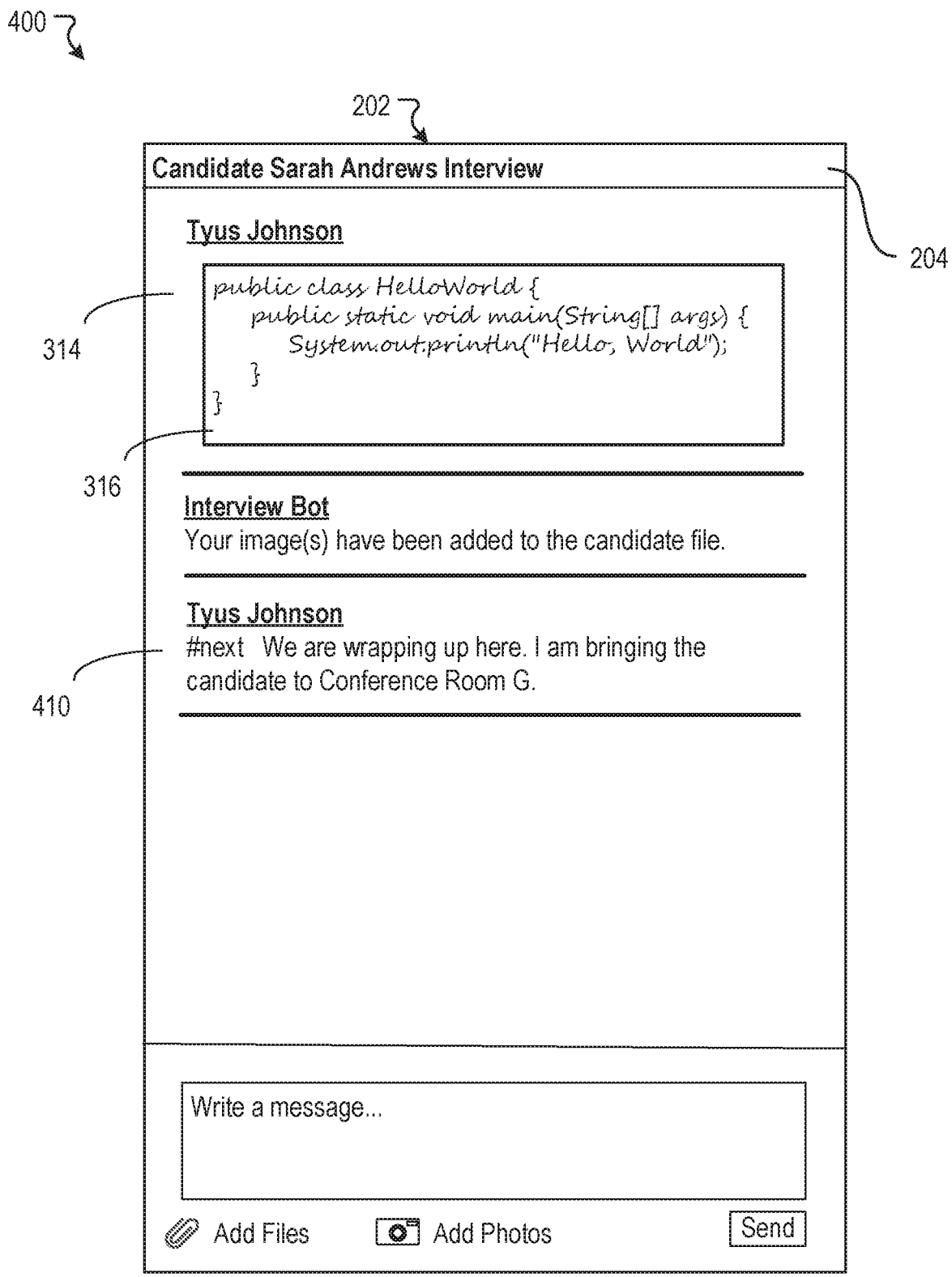
FIGS. 4A-B illustrate an example scenario associated with utilizing an interview bot to initiate communications between an interviewer and other individuals, according to an embodiment of the present disclosure.
Figure 4B:
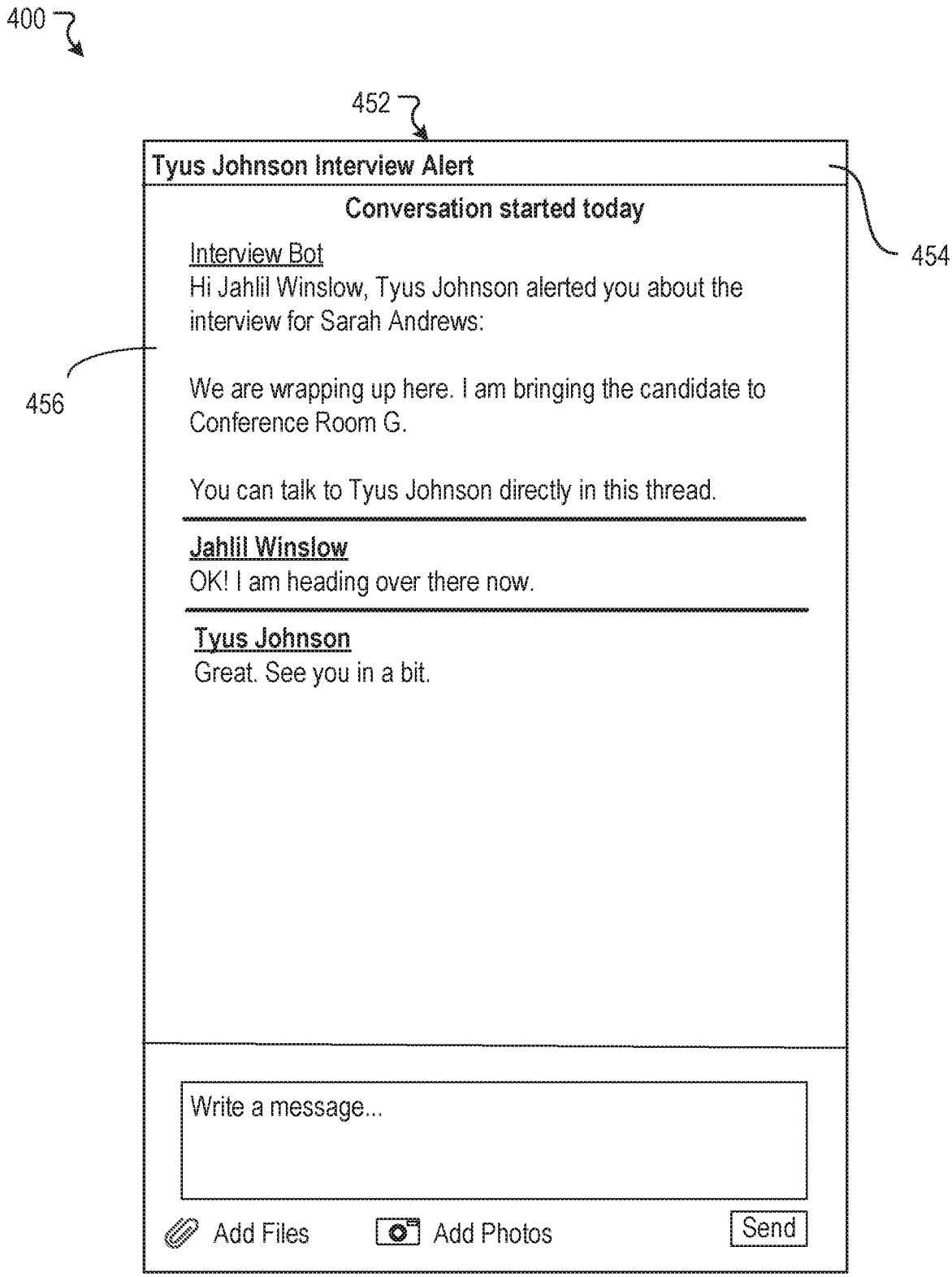

FIGS. 4A-B illustrate an example scenario 400 associated with utilizing an interview bot to initiate communications between an interviewer and other individuals. In FIG. 4A, the messaging session 202 continues with an interviewer message 410, which reads: "# next We are wrapping up here. I am bringing the candidate to Conference Room G." The message 410 includes a pre-defined term "# next," which indicates that the interviewer would like to send a message to the next interviewer scheduled for the current candidate. The interview bot can be configured to automatically determine the next scheduled interviewer, and to initiate a new messaging session between the interviewer and the next scheduled interviewer. In FIG. 4B, the interview bot has initiated a new messaging session 452 between the current interviewer, Tyus Johnson, and the next scheduled interviewer, Jahlil Winslow. The new messaging session 452 has been automatically titled "Tyus Johnson Interview Alert," and has a first message 456. The first message 456 includes the message sent by Tyus Johnson to the interview bot in the messaging session 202, i.e., "We are wrapping up here. I am bringing the candidate to Conference Room G." The next scheduled interviewer, Jahlil Winslow, and the current interviewer, Tyus Johnson, can communicate directly with one another in messaging session 452.

Figure 5:
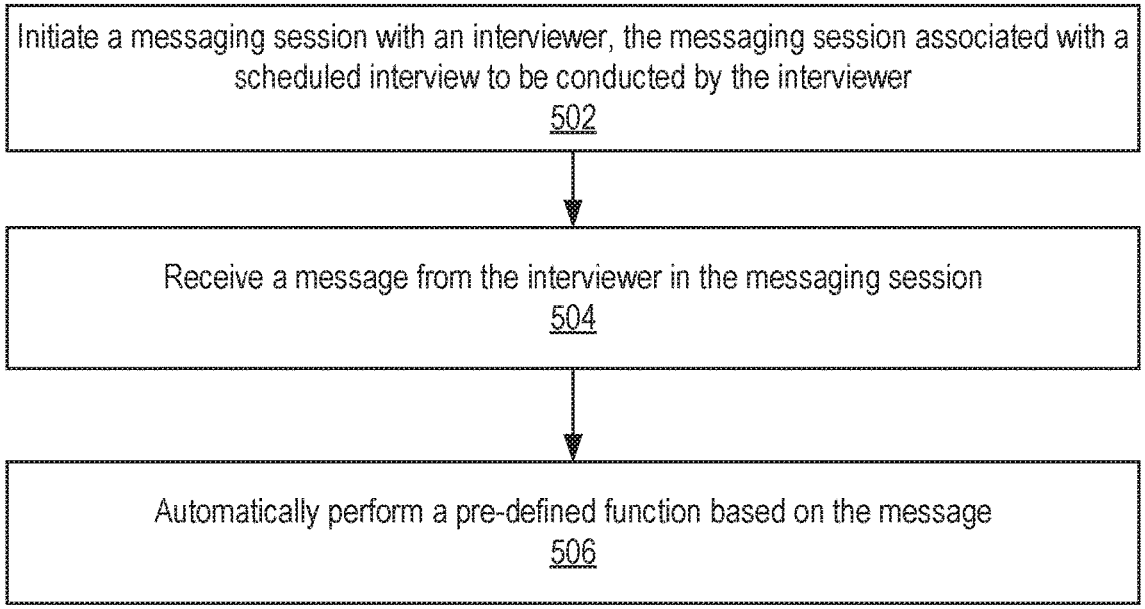
FIG. 5 illustrates an example method associated with providing automated assistance for a scheduled interview, according to an embodiment of the present disclosure.

FIG. 5 illustrates an example method 500 associated with providing automated assistance for a scheduled interview, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can initiate a messaging session with an interviewer, the messaging session associated with a scheduled interview to be conducted by the interviewer. At block 504, the example method 500 can receive a message from the interviewer in the messaging session. At block 506, the example method 500 can automatically perform a pre-defined function based on the message.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
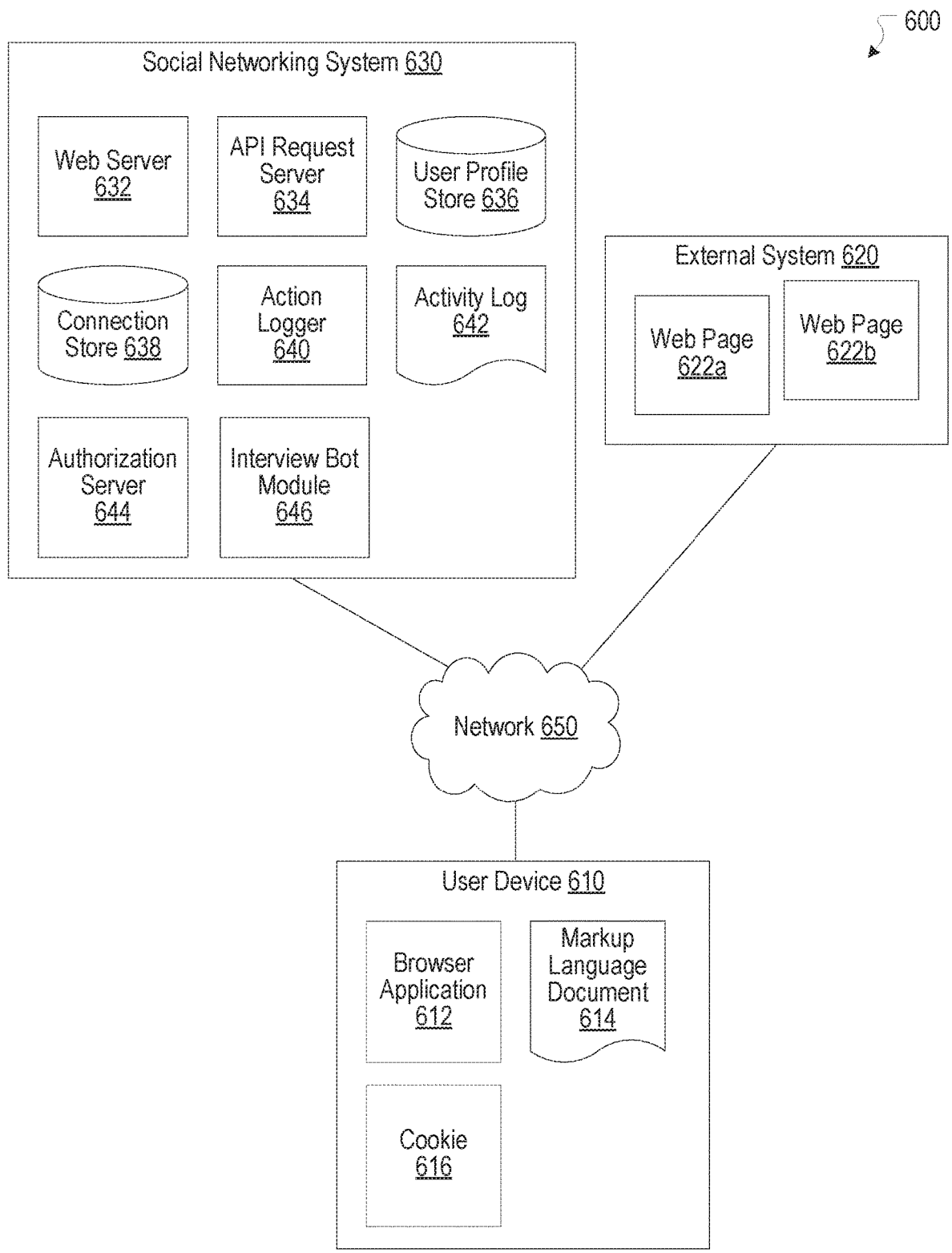
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an interview bot module 646. The interview bot module 646 can, for example, be implemented as the interview bot module 102, as discussed in more detail herein. As discussed previously, it should be appreciated that there can be many variations or other possibilities. For example, in some embodiments, one or more functionalities of the interview bot module 646 can be implemented in the user device 610.

Hardware Implementation

Figure 7:
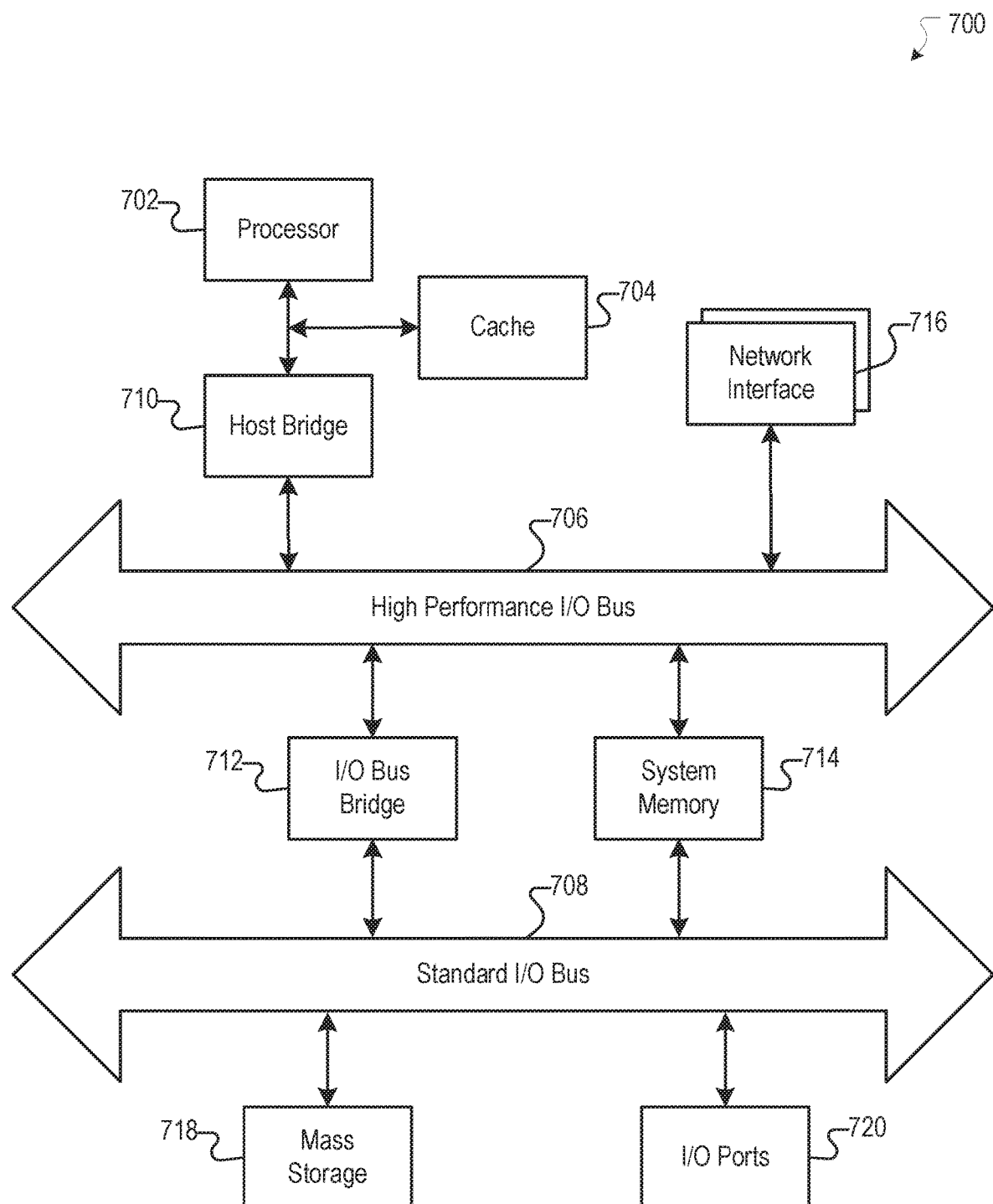
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed)

network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   initiating, by a computing system, an instant messaging session between an interview bot and an interviewer, wherein
      the instant messaging session is associated with a scheduled interview of a job candidate to be conducted by the interviewer and allows the interviewer to communicate with the interview bot for automated assistance for the scheduled interview;
   receiving, by the computing system, a message from the interviewer in the instant messaging session; and
   automatically performing, by the computing system, a pre-defined function based on one or more pre-defined terms included in the message, wherein other messages that do not include the one or more pre-defined terms are used to update a candidate file associated with the job candidate.

2. The computer-implemented method of claim 1, further comprising:
   identifying the one or more pre-defined terms in the message, wherein
   the automatically performing the pre-defined function based on the message comprises performing the pre-defined function associated with the one or more pre-defined terms.

3. The computer-implemented method of claim 1, wherein the automatically performing the pre-defined function comprises initiating a messaging session between the interviewer and one or more additional individuals.

4. The computer-implemented method of claim 3, wherein the automatically performing the pre-defined function comprises:
   identifying an interview coordinator associated with the scheduled interview; and
   initiating a messaging session between the interviewer and the interview coordinator.

5. The computer-implemented method of claim 3, wherein the automatically performing the pre-defined function comprises:
   identifying a subsequent interviewer associated with the scheduled interview; and
   initiating a messaging session between the interviewer and the subsequent interviewer.

6. The computer-implemented method of claim 1, wherein the automatically performing the pre-defined function comprises:
   identifying interview information associated with the scheduled interview; and
   submitting a message to the instant messaging session comprising the interview information.

7. The computer-implemented method of claim 6, wherein the interview information comprises at least one of: interview location information, telephonic dial-in information, or video-conference information.

8. The computer-implemented method of claim 1, wherein the automatically performing the pre-defined function comprises updating the candidate file associated with the candidate.

9. The computer-implemented method of claim 8, further comprising identifying a pre-defined term in the message indicative of an interviewer request to upload information to a particular portion of the candidate file, wherein
   the automatically performing the pre-defined function comprises uploading at least a portion of the message to the particular portion of the candidate file.

10. The computer-implemented method of claim 8, wherein
    the message comprises an image, and
    the pre-defined function comprises uploading the image to the candidate file.

11. A system comprising:
    at least one processor; and
    a memory storing instructions that, when executed by the at least one processor, cause the system to perform a method comprising:
    initiating an instant messaging session between an interview bot and an interviewer, wherein
       the instant messaging session is associated with a scheduled interview of a job candidate to be conducted by the interviewer and allows the interviewer to communicate with the interview bot for automated assistance for the scheduled interview;
    receiving a message from the interviewer in the instant messaging session; and
    automatically performing a pre-defined function based on one or more pre-defined terms included in the message, wherein other messages that do not include the one or more pre-defined terms are used to update a candidate file associated with the job candidate.

12. The system of claim 11, wherein the method further comprises:
    identifying the one or more pre-defined terms in the message, wherein
    the automatically performing the pre-defined function based on the message comprises performing the pre-defined function associated with the one or more pre-defined terms.

13. The system of claim 11, wherein the automatically performing the pre-defined function comprises initiating a messaging session between the interviewer and one or more additional individuals.

14. The system of claim 13, wherein the automatically performing the pre-defined function comprises:
- identifying an interview coordinator associated with the scheduled interview; and
- initiating a messaging session between the interviewer and the interview coordinator.

15. The system of claim 13, wherein the automatically performing the pre-defined function comprises:
- identifying a subsequent interviewer associated with the scheduled interview; and
- initiating a messaging session between the interviewer and the subsequent interviewer.

16. A non-transitory computer-readable storage medium including instructions that, when executed by at least one processor of a computing system, cause the computing system to perform a method comprising:
- initiating an instant messaging session between an interview bot and an interviewer, wherein
  - the instant messaging session is associated with a scheduled interview of a job candidate to be conducted by the interviewer and allows the interviewer to communicate with the interview bot for automated assistance for the scheduled interview;
- receiving a message from the interviewer in the messaging session; and
- automatically performing a pre-defined function based on one or more pre-defined terms included in the message, wherein other messages that do not include the one or more pre-defined terms are used to update a candidate file associated with the job candidate.

17. The non-transitory computer-readable storage medium of claim 16, wherein the method further comprises:
- identifying the one or more pre-defined terms in the message, wherein the automatically performing the pre-defined function based on the message comprises performing the pre-defined function associated with the one or more pre-defined terms.

18. The non-transitory computer-readable storage medium of claim 16, wherein the automatically performing the pre-defined function comprises initiating a messaging session between the interviewer and one or more additional individuals.

19. The non-transitory computer-readable storage medium of claim 18, wherein the automatically performing the pre-defined function comprises:
- identifying an interview coordinator associated with the scheduled interview; and
- initiating a messaging session between the interviewer and the interview coordinator.

20. The non-transitory computer-readable storage medium of claim 18, wherein the automatically performing the pre-defined function comprises:
- identifying a subsequent interviewer associated with the scheduled interview; and
- initiating a messaging session between the interviewer and the subsequent interviewer.

* * * * *